United States Patent
Mattson et al.

(10) Patent No.: US 9,690,878 B2
(45) Date of Patent: Jun. 27, 2017

(54) GEOMETRIC MODELING WITH MUTUALLY DEPENDENT BLENDS

(71) Applicants: Howard Charles Duncan Mattson, Cambridge (GB); Douglas Joseph King, Peterborough (GB); Paul Jonathon Sanders, Cambridge (GB)

(72) Inventors: Howard Charles Duncan Mattson, Cambridge (GB); Douglas Joseph King, Peterborough (GB); Paul Jonathon Sanders, Cambridge (GB)

(73) Assignee: SIEMENS PRODCUT LIFECYCLE MANAGEMENT SOFTWARE INC, Plano, TX (US)

( * ) Notice: Subject to any disclaimer, the term of this patent is extended or adjusted under 35 U.S.C. 154(b) by 1062 days.

(21) Appl. No.: 13/903,503

(22) Filed: May 28, 2013

(65) Prior Publication Data
US 2014/0358490 A1    Dec. 4, 2014

(51) Int. Cl.
*G06F 17/50*    (2006.01)
*G06T 17/10*    (2006.01)

(52) U.S. Cl.
CPC .......... *G06F 17/50* (2013.01); *G06F 17/5086* (2013.01); *G06T 17/10* (2013.01); *G06F 2217/06* (2013.01)

(58) Field of Classification Search
CPC ...... G06F 17/50; G06F 17/5086; G06T 17/10
See application file for complete search history.

(56) References Cited

U.S. PATENT DOCUMENTS 5,251,160 A * 10/1993 Rockwood .............. G06T 17/00
                                              345/442
2002/0180729 A1    12/2002 Venkataraman et al.
(Continued)

FOREIGN PATENT DOCUMENTS

EP       2 028 623 A1    2/2009
JP       2003022285 A    1/2003
(Continued)

OTHER PUBLICATIONS

R. Joan-Arinyo et al., "Transforming an under-constrained geometric constraint problem into a well-constrained one," 2003, Proceedings of the eighth ACM symposium on Solid modeling and applications, pp. 33-44.*

(Continued)

*Primary Examiner* — Kamini S Shah
*Assistant Examiner* — Russ Guill

(57) ABSTRACT

Methods for product data management and corresponding systems and computer-readable mediums. A method includes receiving a geometric model including plurality of blends and identifying a blend ribbon that includes at least two of the plurality of blends. Each blend in the blend ribbon is mutually dependent on at least one other blend in the blend ribbon. The method includes selecting a blend ribbon breaker corresponding to the blend ribbon and designating a plurality of blends in the blend ribbon as reblendable blends, based on the blend ribbon breaker. The method includes reblending the reblendable blends to produce a modified geometric model and storing the modified geometric model.

20 Claims, 7 Drawing Sheets

(56) References Cited

U.S. PATENT DOCUMENTS

2010/0305906 A1* 12/2010 Yu ........................ G06T 17/10
 703/1
2011/0282632 A1* 11/2011 Rameau ................ G06T 17/10
 703/1
2012/0078581 A1   3/2012 Mattson et al.

FOREIGN PATENT DOCUMENTS

JP   2006294036 A   10/2006
WO   2012/058604 A2   5/2012

OTHER PUBLICATIONS

Hsu, C., et al.: "A Constraint-Based Manipulator Toolset for Editing 3D Objects", (XP-000724303); Proceedings of the Fourth Symposium on Solid Modeling and Applications Atlanta, GA, May 14-16, 1997, vol. Symp. 4, May 14, 1997 (14 pages).
PCT search Report dated Sep. 4, 2014, for application No. PCT/US2014/038167. (20 pages).

* cited by examiner

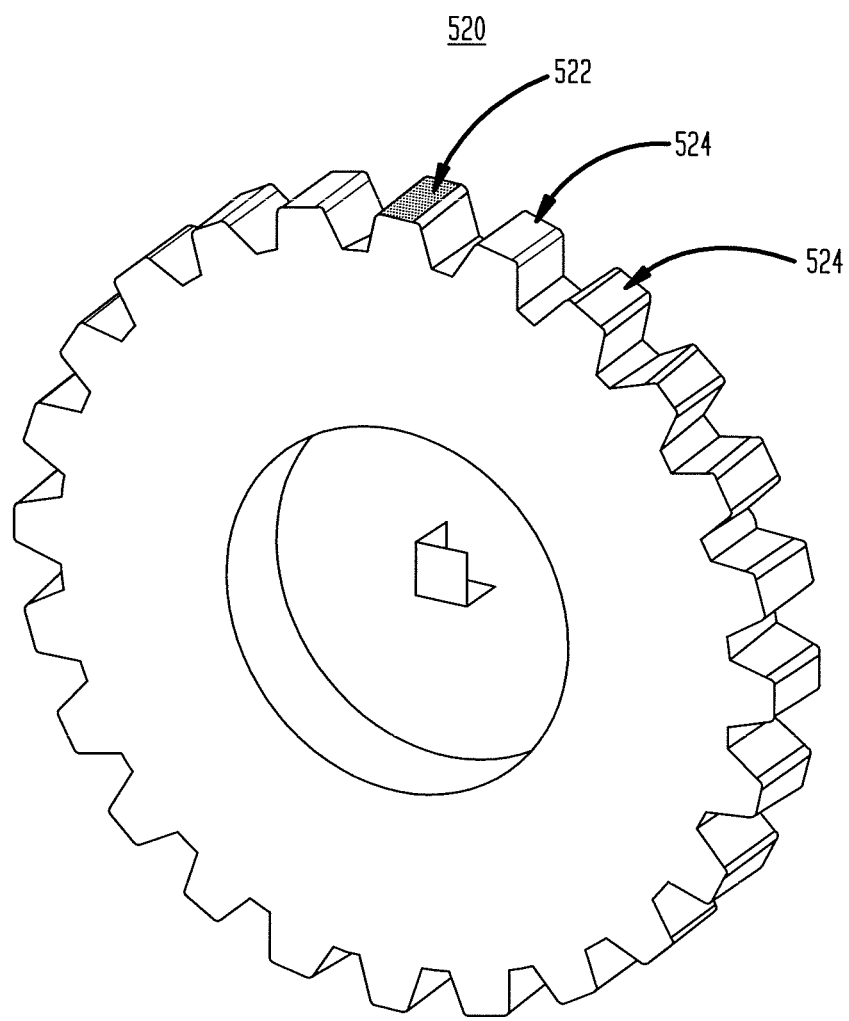

GEOMETRIC MODELING WITH MUTUALLY DEPENDENT BLENDS

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums. A method includes receiving a geometric model including a plurality of blends and identifying a blend ribbon that includes at least two of the plurality of blends. Each blend in the blend ribbon is mutually dependent on at least one other blend in the blend ribbon. The method includes selecting a blend ribbon breaker corresponding to the blend ribbon and designating a plurality of blends in the blend ribbon as reblendable blends, based on the blend ribbon breaker. The method includes reblending the reblendable blends to produce a modified geometric model and storing the modified geometric model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 5A-5C illustrate examples of the selection of ribbon breakers in accordance with disclosed embodiments;

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

"Re-blend" is an important function within synchronous modeling. When a design face of a geometric model is changed the surrounding blend faces are recomputed (re-blended) to accommodate the change applied to the design face. A blend face is computed based on the two underlying faces that are the two sides of the edge being blended. An "under," as used herein, refers to each of the curves (in 2D representations) or faces (in 3D representations) that underlie a blend and on which the blend depends. "Unders" refers to more than one "under". In order to re-blend, both unders need to exist. As described herein, a blend can itself be an under for another blend.

Mutually dependent blends cannot both be re-blended simultaneously while their unders are moving. Disclosed embodiments include systems and methods for breaking the dependency of mutually-dependent blends to allow more re-blends to occur as the geometric model is edited.

Figure 1:
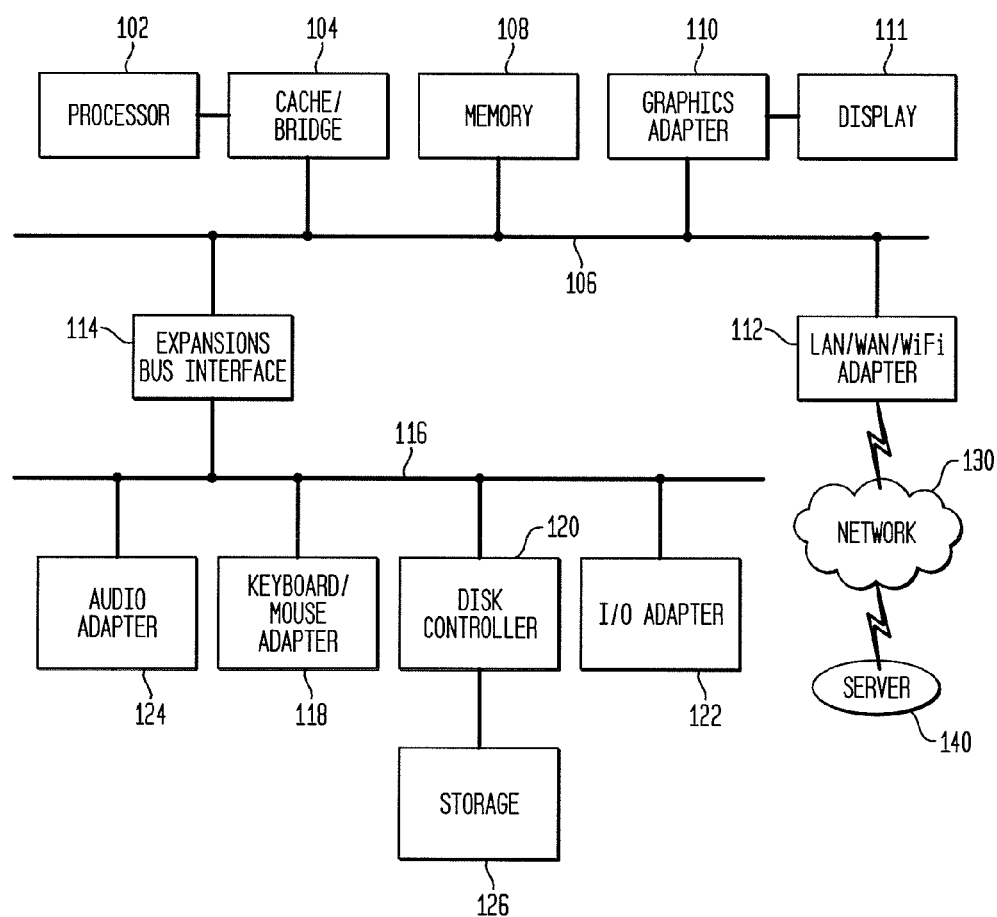
FIG. 1 depicts a block diagram of a data processing system in which an embodiment can be implemented.

FIG. 1 illustrates a block diagram of a data processing system in which an embodiment can be implemented, for example, as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/ Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
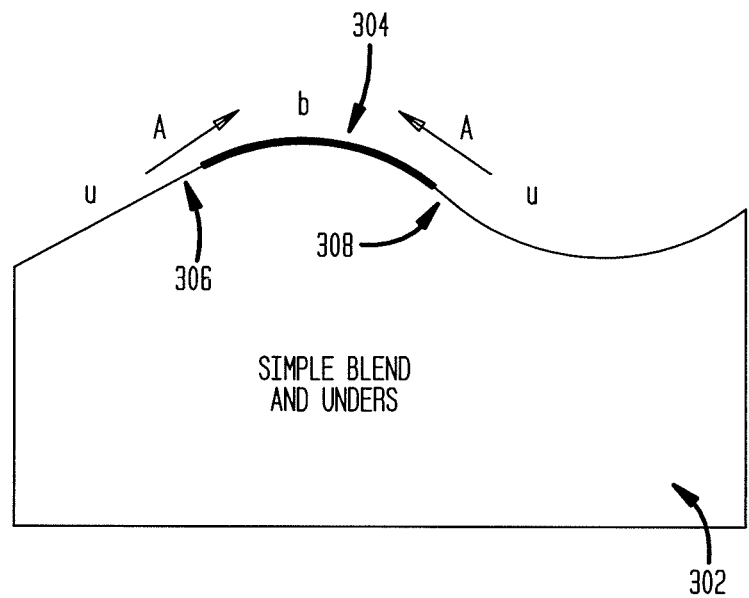
FIGS. 2 and 3 illustrate simple geometric models with blends in accordance with disclosed embodiments.
Figure 3:
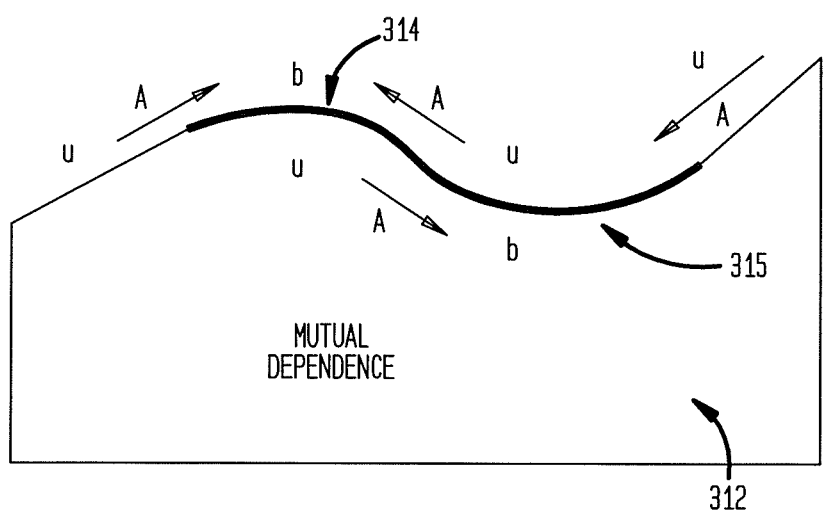

FIGS. 2 and 3 illustrate simple geometric models with blends. In these examples, a two-dimensional (2D) model is shown, but the discussions and processes described herein also apply to three-dimensional (3D) models.

FIG. 2 illustrates a simple geometric model 302 with blend 304 shown by the emphasized curve b. Blend 304 is formed by a blending process on two curves 306 and 308 represented by u. Curves 306 and 308 in this example are the unders of blend 304. Each arrow A in this diagram shows the logical local order from an under u to a blend b which depends on it.

Blends depend on their unders, of which there are typically two but may be more. When a geometry changes, a system will seek to identify the blends depending on any affected unders and "re-blend" them once the under geometry has been calculated. Re-blending is therefore essentially an ordered process.

However, "mutually dependent" blends are blends that function as unders of each other, so it is generally not possible to re-blend them both in an ordered way.

FIG. 3 illustrates a simple geometric model 312 with blends 314 and 315 shown by the emphasized curves b. Unders for each of the blends are shown and marked u. Once again, each arrow A in this diagram shows the logical local order from an under u to a blend b which depends on it. In this case, however, each blend is also an under—of the other blend. This means they are "mutually dependent" and an order in which to reblend them both cannot be established.

Disclosed embodiments include systems and methods for breaking the mutual dependence relationship to allow re-blending to occur in such cases. To do so, disclosed embodiments can identify mutually dependent blend ribbons, select mutually dependent blend ribbon breakers, break the dependencies based on ribbons and breakers, and then cache or store the result. Each of these is described in more detail below.

Figure 4A:
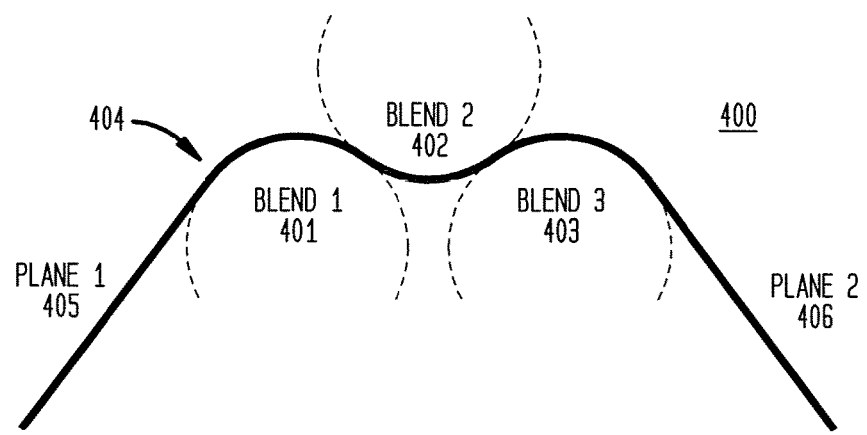
FIGS. 4A and 4B illustrate blend ribbons in accordance with disclosed embodiments.
Figure 4B:
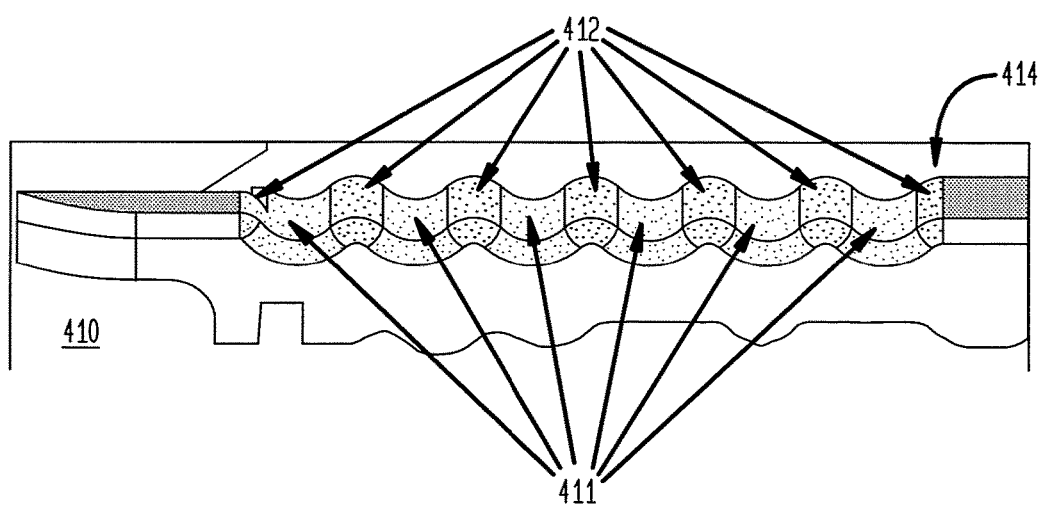

FIGS. 4A and 4B illustrate blend ribbons in accordance with disclosed embodiments.

A "mutually dependent blend ribbon" (or simply "blend ribbon"), as used herein, refers to a set of blends in a geometric model where all blends in the set are mutually dependent, and for each blend in the set, all its mutually dependent unders are also in the set.

The same blend ribbon can therefore be discovered from any blend within the ribbon. This property is important during the propagation phase of a synchronous modeling edit, as the order of propagation is not defined, and can be used in any system to identify the entire blend ribbon from any of its blends.

FIG. 4A illustrates a blend ribbon, in accordance with disclosed embodiments, in a 2D geometric model 400. In this example, blend 1 401, blend 2 402, and blend 3 403 are a blend ribbon 404. Each of these blends 401-403 is mutually dependent. Note that the non-mutually dependent unders, plane 1 405 of blend 1 401 and plane 2 406 of blend 3 403, are not part of the blend ribbon 404.

FIG. 4B illustrates a blend ribbon, in accordance with disclosed embodiments, in a 3D geometric model 410. In this example, the lower blends 411 and the upper blends 412 are all mutually dependent blends and together form a blend ribbon 414.

A "mutually dependent blend ribbon breaker" (or simply "ribbon breaker") as used herein, refers to an entity chosen to break a blend ribbon. A ribbon breaker is not treated as a blend in the process described herein.

Various methods for selecting ribbon breakers can be implemented. One method for selecting ribbon breakers is to make use of the edit the user has chosen to do on the model. In a synchronous modeling edit, the user typically first selects the entities to act upon and then the action to take. For example, the user can select a face and choose to move it in a given direction. This selection-driven approach allows the system to automatically choose ribbon breakers. The choice depends on the operation; some non-limiting examples of ribbon breakers are directly selected entities being operated on, e.g. faces being rotated, entities that are part of an object being edited, e.g. a cylindrical face with a radius relation, or the unders of any blends being edited.

The system can then expand or filter this list of ribbon breakers by a variety of techniques such as extending the ribbon breakers to include other faces in the model identical to the existing ribbon breakers or filtering out any non-mutually dependent blends from the ribbon breakers.

Figure 5A:
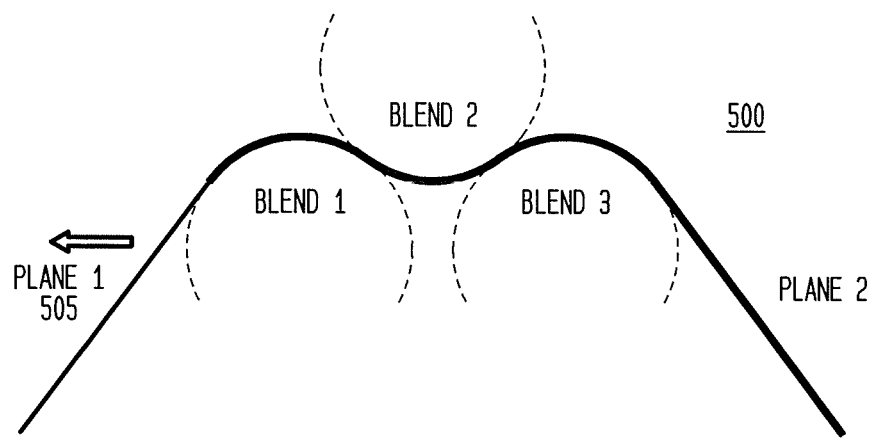
Figure 5B:
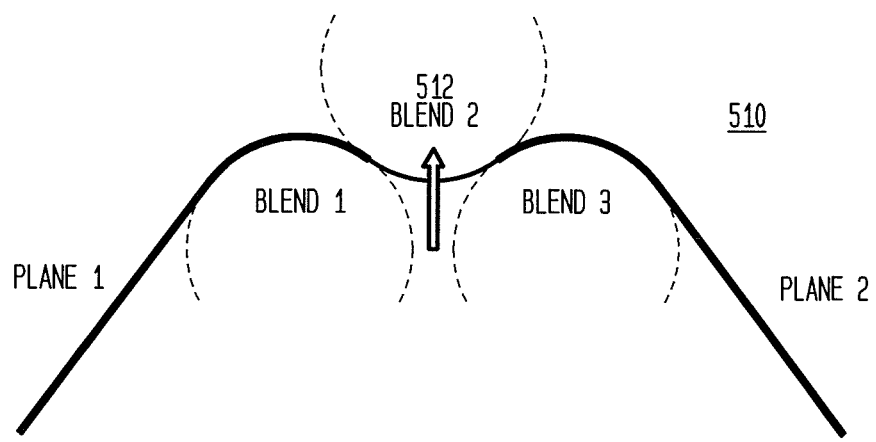

FIGS. 5A-5C illustrate examples of the selection of ribbon breakers in accordance with disclosed embodiments.

FIG. 5A illustrates a 2D geometric model 500, where plane 1 505 is selected by the user to be moved, as indicated by the arrow. In this example, plane 1 505, the entity being operated on, is selected by the system as the ribbon breaker.

FIG. 5B illustrates a 2D geometric model 510, where blend 2 512 is selected by the user to be moved, as indicated by the arrow. In this example, blend 2 512, the entity being operated on, is selected by the system as the ribbon breaker.

FIG. 5C illustrates a 3D geometric model 520, where face 522 is selected by the user, to change the radius of the model 520. In this case, face 522 and all of the faces that are identical to face 522, such as faces 524 (and other identical faces) are selected by the system as ribbon breakers.

When the blend ribbons have been identified and ribbon breakers have been selected, the system can break the circular dependencies. The following processes allow the maximum number of reblendable blends to exist within the ribbon in most cases.

For a blend ribbon terminated by one ribbon breaker, the system can alternately designate each entity to be a reblendable blend, and designate the other entities in the blend ribbon as non-reblendable blends, propagating out from the ribbon breaker to the end of the ribbon.

For a blend ribbon terminated by two ribbon breakers, the system alternately designates each entity to be a reblendable blend, and designates the other entities in the blend ribbon as non-reblendable blends, propagating out evenly from each ribbon breaker until the propagation meets in the middle of the ribbon. Where the propagation meets, if a complete step from both sides cannot be completed without designating two adjacent entities as reblendable blends, the system does not mark any faces as reblendable blends within that final step.

Once some alternate entities in the blend ribbon are designated as reblendable blends, and other entities of the blend ribbon are designated as non-reblendable blends, the blend ribbon is considered "broken" and the designated reblendable blends can be reblended as in a conventional re-blend process, while the designated "non-reblendable blends" are not reblended at that time.

Figure 6:
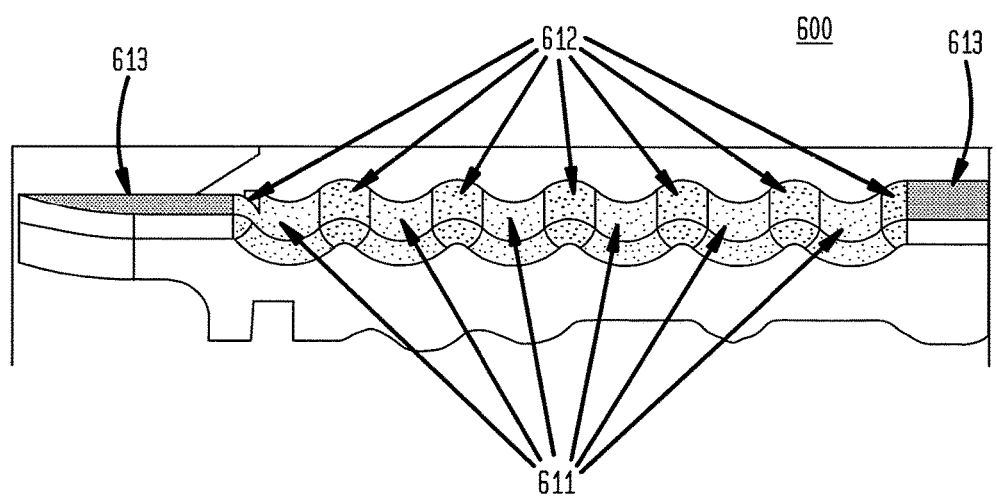
FIG. 6 illustrates an example of designating reblendable blends and non-reblendable blends in accordance with disclosed embodiments.

FIG. 6 illustrates an example of designating reblendable blends and non-reblendable blends in a blend ribbon of a 3D geometric model 600. In this example, faces 613 are selected as ribbon breakers, so the process above will determine that upper blends 612 (alternate faces beginning with the ribbon breaker) are reblendable blends and the lower blends 611 (the remaining faces) are non-reblendable blends for the purposes of the re-blend operation.

The system can store or cache the results of the operations above, so that the blend ribbons, ribbon breakers, and designated reblendable blends and non-reblendable blends can be reused in further blend operations and other operations.

Figure 7:
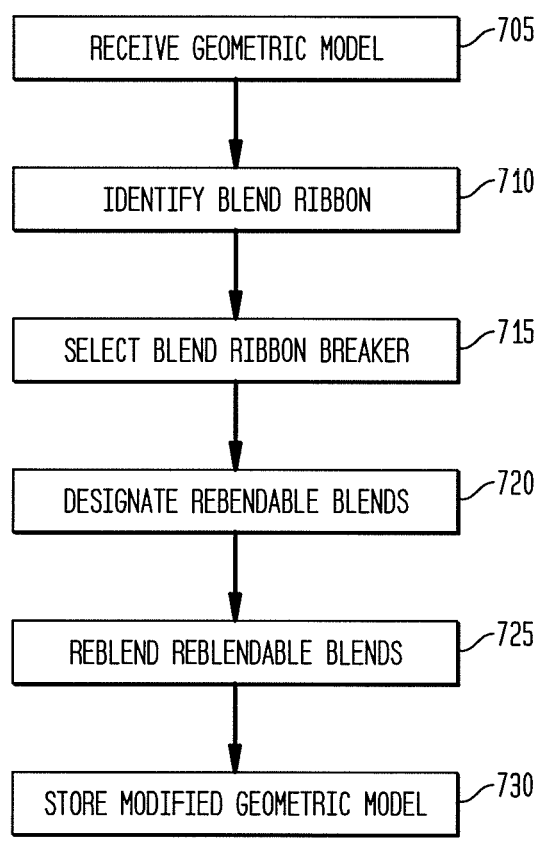
FIG. 7 illustrates a flowchart of a process in accordance with disclosed embodiments.

FIG. 7 illustrates a flowchart of a process in accordance with disclosed embodiments that may be performed, for example, by one or more CAD, PLM, or PDM systems (referred to generically herein as "the system").

The system receives a geometric model including a plurality of blends, each of the blends having a plurality of unders (705). "Receiving," as used herein, can include loading from storage, receiving from another device or process, receiving via an interaction with a user, and otherwise. The geometric model can be 2D or 3D.

The system identifies a blend ribbon that includes at least two of the plurality of blends (710), each of the blends in the blend ribbon being mutually dependent on at least one other blend in the blend ribbon. This can be performed automatically by the system without user input or prompting, or can be performed in response to a user input such as a selection of one of the blends, the selection of another feature of the geometric model, or an edit to be made to the geometric model.

The system selects a blend ribbon breaker corresponding to the blend ribbon (715). This can include receiving a selection of an element in the blend ribbon from a user (if not already received) or receiving an edit to the geometric model from a user. The system can select more than one blend ribbon breaker in this step.

The system designates, based on the blend ribbon breaker, a plurality of the blends in the blend ribbon as reblendable blends (720). This step can include designating the remaining blends in the blend ribbon as non-reblendable blends. In various embodiments, no two adjacent blends will both be designated as reblendable blends. This step can include propagating through the blend ribbon from the blend ribbon breaker(s) to designate every other (each alternating) blend in the blend ribbon as a reblendable blend. This step is intended to include implementations where only non-reblendable blends are explicitly designated and the reblendable blends are therefore designated by exclusion.

The system reblends the reblendable blends to produce a modified geometric model (725). In various embodiments, the system does not reblend the non-reblendable blends in this operation. This process can be performed as part of another operation to modify the geometric model and can be performed as a variational edit of the geometric model.

The system stores or displays the modified geometric model (step 730). This can include caching or otherwise storing the blend ribbon, the blend ribbon breaker, the designated reblendable blends, or the designated non-reblendable blends.

Disclosed embodiments can provide more efficient and accurate editing for mutually dependent blends as re-blends as opposed to other methods such as explicit solving using tangency conditions.

In some embodiments, the set of ribbon breakers can include entities that are related to the initial set by other geometric relations, such as symmetry or offset. Ribbon breakers can also be computed for ribbons not directly related to the input of the operation. Various criteria can be used including the relative size of blends and large numbers of geometrically identical entities within a ribbon In some embodiments, the relative size of neighboring blend faces can be used to differentiate more "blend like" entities within the ribbon, designating those as "blends" for the purposes of the re-blend operation, and designating other non-adjacent entities as "not blends" for the purposes of the re-blend operation.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for performing blends in a geometric model, the method performed by a data processing system and comprising:
   through operation of at least one processor of the data processing system:
   receiving a geometric model including a plurality of blends, wherein each blend corresponds to a geometric curve or a face adjacent and between at least two unders that correspond to geometric faces or curves, wherein each blend blends the at least two unders together and which has a shape that is dependent on the positions of the at least two unders;
   identifying a blend ribbon, wherein a blend ribbon corresponds to a set of at least two of the plurality of blends, wherein each blend in the blend ribbon is mutually dependent on at least one other blend in the blend ribbon such that the mutually dependent blends are unders of each other;
   receiving through an input device at least one input representative of a manipulation of at least one of a blend or an under;
   responsive to the at least one input, selecting at least one blend ribbon breaker for the blend ribbon, which blend ribbon breaker corresponds to the manipulated at least one blend or under and optionally at least one other non-adjacent blend or under;
   breaking circular dependencies of mutually dependent blends by designating a plurality of non-adjacent blends in the blend ribbon as reblendable blends and designating at least one of the blends in the blend ribbon as non-reblendable, based on the selected at least one blend ribbon breaker;
   modifying the geometric model to produce a modified geometric model based on the at least one input including reblending the designated reblendable blends to have a modified shape while not reblending the designated non-reblendable blends; and
   storing the modified geometric model.

2. The method of claim 1, wherein no two adjacent blends in the blend ribbon are designated as reblendable blends.

3. The method of claim 1, wherein any blends in the blend ribbon that are not designated as reblendable blends are not reblended when the reblendable blends are reblended.

4. The method of claim 1, wherein the system stores at least one of the blend ribbon, the blend ribbon breaker, the designated reblendable blends, or designated non-reblendable blends.

5. The method of claim 1, wherein designating the plurality of blends of the blend ribbon includes propagating through the blend ribbon from the blend ribbon breaker and designating each alternating blend in the blend ribbon as reblendable blends.

6. The method of claim 1, wherein a plurality of blend ribbon breakers are selected, and designating a plurality of blends in the blend ribbon as reblendable blends is based on each of the blend ribbon breakers.

7. The method of claim 1, wherein the geometric model is a three-dimensional model.

8. A data processing system comprising:
   a processor; and an accessible memory, wherein the processor is configured to:
   receive a geometric model including a plurality of blends, wherein each blend corresponds to a geometric curve or a face adjacent and between at least two unders that correspond to geometric faces or curves, wherein each blend blends the at least two unders together and which has a shape that is dependent on the positions of the at least two unders;
   identify a blend ribbon, wherein a blend ribbon corresponds to a set of at least two of the plurality of blends, wherein each blend in the blend ribbon is mutually dependent on at least one other blend in the blend ribbon such that the mutually dependent blends are unders of each other;
   receive through an input device at least one input representative of a manipulation of at least one of a blend or an under;
   responsive to the at least one input, select at least one blend ribbon breaker for the blend ribbon, which blend ribbon breaker corresponds to the manipulated at least one blend or under and optionally at least one other non-adjacent blend or under;
   break circular dependencies of mutually dependent blends by designating a plurality of non-adjacent blends in the blend ribbon as reblendable blends and designating at least one of the blends in the blend ribbon as non-reblendable, based on the selected at least one blend ribbon breaker;
   modify the geometric model to produce a modified geometric model based on the at least one input including reblending the designated reblendable blends to have a modified shape while not reblending the designated non-blendable blends; and
   store the modified geometric model.

9. The data processing system of claim 8, wherein no two adjacent blends in the blend ribbon are designated as reblendable blends.

10. The data processing system of claim 8, wherein any blends in the blend ribbon that are not designated as reblendable blends are not reblended when the reblendable blends are reblended.

11. The data processing system of claim 8, wherein the system stores at least one of the blend ribbon, the blend ribbon breaker, the designated reblendable blends, or designated non-reblendable blends.

12. The data processing system of claim 8, wherein designating the plurality of blends of the blend ribbon includes propagating through the blend ribbon from the blend ribbon breaker and designating each alternating blend in the blend ribbon as reblendable blends.

13. The data processing system of claim 8, wherein a plurality of blend ribbon breakers are selected, and designating a plurality of blends in the blend ribbon as reblendable blends is based on each of the blend ribbon breakers.

14. The data processing system of claim 8, wherein the geometric model is a two-dimensional or three-dimensional model.

15. A non-transitory computer-readable medium encoded with executable instructions that, when executed, cause one or more processors of a data processing systems to carry out a method comprising receive a geometric model including a plurality of blends, wherein each blend corresponds to a geometric curve or a face adjacent and between at least two unders that correspond to geometric faces or curves, wherein each blend blends the at least two unders together and which has a shape that is dependent on the positions of the at least two unders;
    identify a blend ribbon, wherein a blend ribbon corresponds to a set of at least two of the plurality of blends, wherein each blend in the blend ribbon is mutually dependent on at least one other blend in the blend ribbon such that the mutually dependent blends are unders of each other;
    receive through an input device at least one input representative of a manipulation of at least one of a blend or an under;
    responsive to the at least one input, select at least one blend ribbon breaker for the blend ribbon, which blend ribbon breaker corresponds to the manipulated at least one blend or under and optionally at least one other non-adjacent blend or under;
    break circular dependencies of mutually dependent blends by designating a plurality of non-adjacent blends in the blend ribbon as reblendable blends and designating at least one of the blends in the blend ribbon as non-reblendable, based on the selected at least one blend ribbon breaker;
    modify the geometric model to produce a modified geometric model based on the at least one input including reblending the designated reblendable blends to have a modified shape while not reblending the designated non-blendable blends; and
    store the modified geometric model.

16. The computer-readable medium of claim 15, wherein no two adjacent blends in the blend ribbon are designated as reblendable blends.

17. The computer-readable medium of claim 15, wherein any blends in the blend ribbon that are not designated as reblendable blends are not reblended when the reblendable blends are reblended.

18. The computer-readable medium of claim 15, wherein the system stores at least one of the blend ribbon, the blend ribbon breaker, the designated reblendable blends, or designated non-reblendable blends.

19. The computer-readable medium of claim 15, wherein designating the plurality of blends of the blend ribbon includes propagating through the blend ribbon from the blend ribbon breaker and designating each alternating blend in the blend ribbon as reblendable blends.

20. The computer-readable medium of claim 15, wherein a plurality of blend ribbon breakers are selected, and designating a plurality of blends in the blend ribbon as reblendable blends is based on each of the blend ribbon breakers.

* * * * *